UNITED STATES PATENT OFFICE.

MORDUCH L. KAPLAN, OF BROOKLYN, NEW YORK, ASSIGNOR TO BEACON MINIATURE ELECTRIC CO., INC., OF NEW YORK, N. Y., A CORPORATION OF NEW YORK.

GALVANIC CELL.

1,178,927.      Specification of Letters Patent.      Patented Apr. 11, 1916.

No Drawing.      Application filed August 14, 1913. Serial No. 784,769.

*To all whom it may concern:*

Be it known that I, MORDUCH L. KAPLAN, a citizen of the United States, and a resident of Brooklyn, in the county of Kings and State of New York, have invented certain new and useful Improvements in Galvanic Cells, of which the following is a specification.

The galvanic cells of the Leclanché type consist of a negative zinc pole, a positive carbon pole, an electrolyte, containing an ammonia salt, and a depolarizing mass consisting of a mixture of carbon or graphite with a higher oxid of manganese.

The higher oxids of manganese originally used were the ones contained in the mineral known as pyrolusite. But this substance in order to serve as an effective depolarizer requires pulverization, and as mechanical pulverization can never be carried far enough to bring all the active ingredients to the surface, only a small fraction of its active principle was utilized. On this account artificial hydrated manganese came into general use, especially in the manufacture of miniature elements. These substances are obtainable in a very fine state of division but possess other disadvantages, viz. first: small specific weight and second: high percentage of hydrat water, which properties combined make it impossible to crowd sufficient active material in a small space.

It is the object of my invention to overcome the objections above specified.

I have discovered that a higher oxid of manganese in a minutest state of division and at the same time forming a heavy dense powder suitable for the purpose of being used as a depolarizer in a galvanic cell of the Leclanché type, can be obtained by exposing manganese carbonate to the action of hot air. I have found also that instead of relying entirely on the action of hot air the carbonate may, with advantage, be first exposed to the oxidizing action of hot air and the oxidation completed by chemical oxidizing agents such as solutions of permanganate, etc.

I claim:

1. A process for making depolarizing material of a dense but highly active character, which consists in exposing carbonate of manganese to heated air, whereby partial oxidation occurs, and in then subjecting the partially oxidized material to the action of a strong oxidizing agent in aqueous solution.

2. A process for making depolarizing material of a dense but highly active porous character, which consists in exposing a basic compound of manganese such as the carbonate of manganese to a gaseous oxidizing agent, whereby a substantial measure of oxidation occurs, and in further oxidizing the product by treatment with an aqueous solution of an oxidizing agent.

3. A process for making depolarizing material of a dense but highly active character adapted for use in miniature dry batteries, which consist in subjecting a basic compound of manganese to dry oxidation, whereby highly active compounds of manganese are formed of a dense character, and in further oxidizing the product by wet oxidation.

Signed at New York, in the county of New York, and State of New York, this 13th day of August, A. D. 1913.

MORDUCH L. KAPLAN.

Witnesses:
ARTHUR MARION,
CHARLES C. GILL.